United States Patent [19]
> Fan et al.

[11] Patent Number: 4,959,540
[45] Date of Patent: Sep. 25, 1990

[54] OPTICAL CLOCK SYSTEM WITH OPTICAL TIME DELAY MEANS

[75] Inventors: Bunsen Fan, Peekskill; Modest M. Oprysko, Mahopac; Ricky A. Rand, Somers, all of N.Y.

[73] Assignee: International Business Machines Corporation, Armonk, N.Y.

[21] Appl. No.: 351,686

[22] Filed: May 15, 1989

[51] Int. Cl.⁵ .......................... H01J 5/16; G02B 6/26
[52] U.S. Cl. ............................ 250/227.12; 350/96.15
[58] Field of Search ................... 250/227, 227.12; 350/96.15, 96.29; 370/3, 4; 455/608, 610, 612

[56] References Cited

U.S. PATENT DOCUMENTS

| | | | |
|---|---|---|---|
| 4,182,935 | 1/1980 | Chown | 370/4 |
| 4,515,428 | 5/1985 | Findakly | 350/96.15 |
| 4,518,858 | 5/1985 | Southard | 250/227 |
| 4,671,605 | 6/1987 | Soref | 350/96.15 |
| 4,743,113 | 5/1988 | Jubinski | 250/227 |
| 4,775,210 | 10/1988 | Fioretti | 350/96.15 |
| 4,870,269 | 9/1989 | Jeunhomme et al. | 250/227 |

*Primary Examiner*—David C. Nelms
*Assistant Examiner*—Michael Messinger
*Attorney, Agent, or Firm*—Whitham & Marhoefer

[57] ABSTRACT

An optical clock system for high-performance computing systems uses unique methods of clock generation, delay timing, and electrical clock conversion to eliminate clock skew due to passive circuit elements. There is provided a direct optical connection to active devices in the computing system thereby eliminating the transmission of electrical clock signals through passive transmission elements. The optical clock system eliminates several stages of clock drivers and, as a result, is capable of reducing clock skew due to active circuit skew as well. In one embodiment, an optical pulse timing operator (10) produces ultrashort pulses which are equally divided by an 1-by-N splitter (16) into N optical fibers (18), where N depends on the number of clock signals required. Each fiber has a different length, resulting in different propagation times for the optical pulses. The light from each of the N fibers are again split into M fibers by N 1-by-M splitters (20), where M depends upon the number of distribution points for the clock. The N×M fibers are regrouped to form a bundle of N fibers, and these M fiber bundles are then coupled to each module (22) where the delayed optical signals are converted into the appropriate electrical clock signals.

19 Claims, 6 Drawing Sheets

FIG. 6A
Branched Waveguide

FIG. 6B
Coupled Waveguide

FIG. 6C
Total Internal Reflection Waveguide

FIG. 7

OPTICAL CLOCK SYSTEM WITH OPTICAL TIME DELAY MEANS

BACKGROUND OF THE INVENTION

1. Field of the Invention

The present invention generally relates to clock systems for computers and, more particularly, to an optical clock system wherein a train of ultrashort optical pulses are generated and transmitted in parallel through optical delay lines to provide optical pulse trains with different desired delay times, and a receiver capable of detecting and converting these pulses into the appropriate electrical signals. The invention has particular application in very high performance computer systems employing very large scale integration (VLSI) and wafer scale integration (WSI) technologies.

2. Description of the Prior Art

Clock timing is a critical factor in digital computing systems. As machine cycle times become shorter, clock skew, which is the temporal uncertainty in clock signals, becomes an increasingly larger fraction of the total cycle time. For systems whose cycle times are below four nanoseconds (ns), clock skew is becoming a major limiting factor.

Since functions in a digital computing system are coordinated by a master clock, accurate distribution, synchronized with the arrival of various signals, must be tightly controlled. Presently, electrical clock signals are transmitted to the various circuit modules in a computer system. Uncertainties in the electrical distribution of signals are due to variations in propagation time through passive and active circuit elements, as well as the influence of coupled noise sources. Passive elements are electrical cables, board and substrate transmission lines, connectors, bonding elements and through vias. Active circuit skew is caused by the difference in propagation time between circuit elements, threshold variations, etc. due to variances in circuit temperature, loading and power supply voltage. Major contributions to skew are the uncertainty of the propagation time and waveform distortion in the electrical transmission path between active circuit elements.

Several proposals have been made to reduce clock skew in electronic computing systems by introducing optical means of transmitting clock information from an electrical clock generator to the appropriate receiving device. Most of these approaches can be considered to be an optical transmission parallel to the present electrical clock distribution system. They are generally based on using a standard electrical oscillator (clock generator) to drive a laser. Typically this laser is a semiconductor diode laser. These approaches are limited because they require powerful laser diodes as well as a fast, clean response. These are difficult to achieve.

Another system of optical clock distribution has been proposed that uses line-of-sight broadcasting of the clock signals directly to the receivers. In this system, there would be a limited number of clock signals (usually just one) that may be transmitted, and since the energy is distributed over a large area, it would require very large optical power to operate.

SUMMARY OF THE INVENTION

It is therefore an object of the present invention to provide a reduction in clock skew to enable the implementation of very short cycle times, particularly in very high performance computing systems.

It is another object of the invention to provide an optical clock system for high-performance computing systems using unique methods of clock generation, delay timing, and optical-to-electrical clock conversion.

It is a further object of the present invention to provide a novel approach to optical clock distribution that overcomes the difficulties of prior art optical distribution systems.

According to the invention, optical clock signals are transmitted directly to active devices in the computing system thereby eliminating the skew arising from the transmission of electrical clock signals through passive transmission elements. The optical clock system of the invention also eliminates several stages of clock drivers and, as a result, is capable of reducing clock skew due to active circuit skew as well. Effects of coupled noise are greatly reduced by the use of the guided optical wave transmission. In a preferred embodiment, an optical pulse timing generator produces ultrashort pulses which are equally divided by a 1-by-N splitter into N optical delay lines, where N depends on the number of clock signals required. Each delay line has a different length, resulting in different propagation times for the optical pulses. The light from each of the N delay lines are again split into M delay lines by 1-by-M splitters, where M depends upon the number of distribution points for the clock. The $N \times M$ delay lines are regrouped to form a group of N delay lines, and these M delay line groups are then coupled to each module where the delayed optical signals are converted into the appropriate electrical clock signals.

In prototype systems, the delay lines are most conveniently implemented using optical fibers which may be readily grouped into bundles. Optical fiber technology allowing coupling of optical pulses from a substrate and to a substrate is well developed allowing for ready prototyping of systems. In VLSI and WSI circuits, delay lines are preferably implemented as waveguides formed in glass or polymers on the silicon wafer surface using well known techniques. Those skilled in the art will recognize that other techniques for implementing optical delay lines may also be used, depending only on the specific application.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
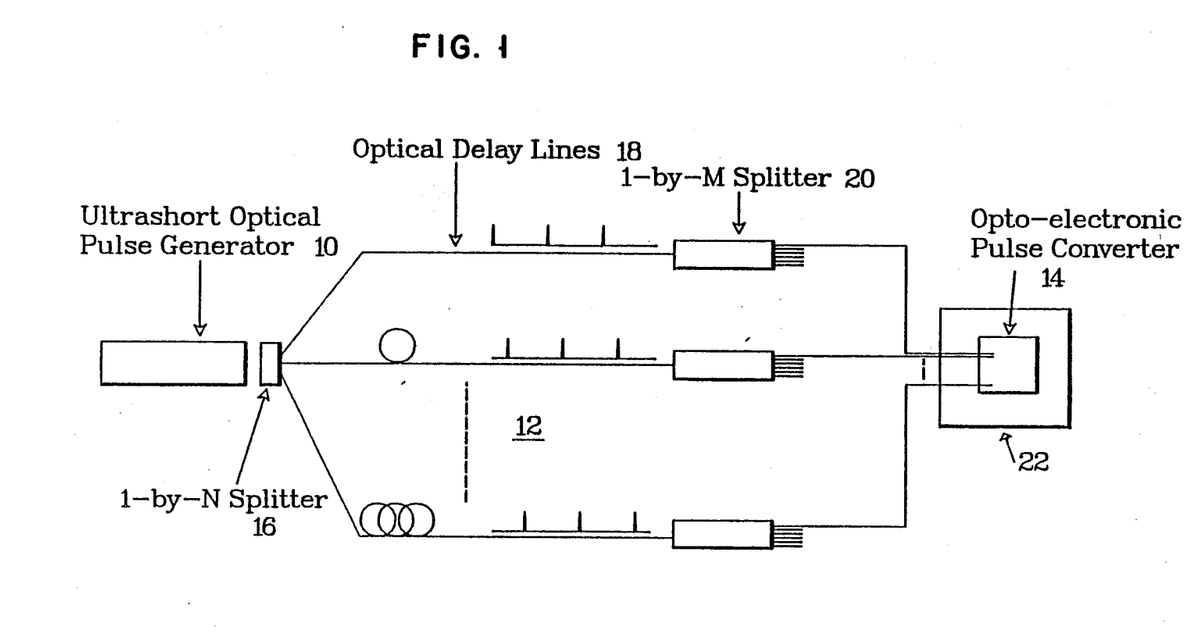
FIG. 1 is a block diagram of the optical clock distribution system according to the invention.

Referring now to the drawings, and more particularly to FIG. 1, there is shown a system block diagram which comprises an optical timing pulse generator 10, a fiber-optic distribution and timing system 12 and an opto-electronic pulse converter 14. An optical pulse is divided equally by a 1-by-N splitter 16 into N individual fibers 18, where N depends on the number of clock signals required. Each fiber has a different length, resulting in different propagation time for the optical pulses. The light pulses from each of the N fibers are again split into M fibers by a 1-by-M splitter 20, where M depends upon the number of distribution points for the clock. Thus, N such splitters are required. The N×M fibers are regrouped to form M bundles of N fibers, each fiber carrying optical delay information. These M fiber bundles are then coupled to each module 22 where the delayed optical signals from a pair of fibers are converted into the appropriate electrical clock signals. Since the clock information is directly distributed to the timing chips on the module, and not through various passive elements with imperfect transmission characteristics, the timing skew is minimized. Due to the fiber's inherent high transmission bandwidth and low dispersion, ultrashort optical pulses can be transmitted with little distortion and attenuation. This is the advantage over electrical transmission lines or cables. The ability to use these ultrashort optical pulses further reduces timing skew by making temporal uncertainty less dependent upon transmission line characteristics and circuit switching parameters, such as threshold variation.

The ultrashort optical timing pulses can be generated by the use of a mode-locked laser. This type of laser is one in which the phases of adjacent, simultaneously oscillating cavity modes are locked, thereby producing periodic ultrashort pulses. Actively mode-locking a continuous wave (CW) laser is a convenient method to generate a train of periodic short optical pulses. The pulse duration is determined by the gain bandwidth of the laser medium. Common values for gas lasers fall in the 150 picosecond (ps) range, as their gain bandwidth is Doppler-broadened. Solid-state lasers, such as neodymium-doped yttrium-aluminum-garnet (Nd:YAG) lasers, have pulse durations of approximately 100 ps. Semiconductor diode lasers can produce mode-locked pulses of one picosecond or shorter. Passively mode-locking the laser can also produce ultrashort optical pulses, as is demonstrated in the operation of a dye laser. A dye laser mode-locked by a saturable absorber can produce pulses of several picoseconds or shorter duration. The pulse train period, i.e., the separation between successive optical pulses, is determined by the time for the optical pulse to travel around the laser cavity. Thus, the pulse period can be precisely controlled by setting the effective cavity length.

Another important advantage of the mode-locked laser system is its ability to produce high peak power pulses with very short rise and fall times, while running at relatively low average power. As an example, an acousto-optically mode-locked argon ion laser can have a peak pulse power of ten watts, with an average power of approximately one hundred milliwatts. The high peak power is essential to provide the large number of clock distribution points required in a high-performance computer system. High peak power allows for a simplified receiver that also contributes minimal circuit jitter to the timing train.

Another commonly used method to generate a train of ultrashort pulses is by gain-switching semiconductor diode lasers, wherein the gain is modulated by periodically injecting current into the lasers. Light pulses of a few picoseconds or shorter duration can be obtained. Optionally, an optical amplifier may be used following the laser source in order to boost the optical power.

The laser pulses are directed into an optical splitter/coupler 16, which divides and couples the energy equally into N fibers. Such beamsplitters are widely available in a variety of technologies. Some of the technologies are fiber splitters, optical waveguides, and conventional beamsplitters constructed from bulk optical components.

Figure 5:
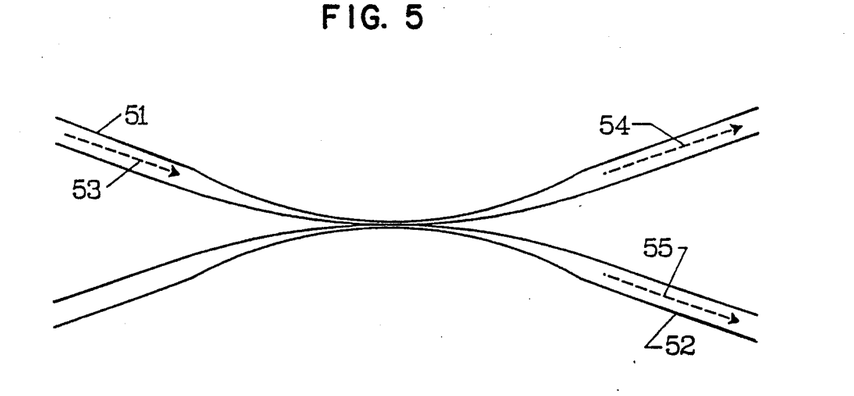
FIG. 5 is a diagram of one example of a fiber-optic splitter which may be used in an implementation of the invention.

Fiber splitters can be based on fused-tapered fibers, etched fibers, or other related fiber technologies. An example of a fused tapered fiber splitter is illustrated in FIG. 5. This splitter is composed of two optical fibers 51 and 52 which have be drawn to form a smaller cross-section portion. The smaller cross-section portions are fused together so that a light pulse 53 propagating along fiber 51, for example, is equally split into two light pulses 54 and 55 in fibers 51 and 52, respectively. Alternatively, the fused tapered splitter can be designed to tap off a fraction of the beam, thereby achieving the same light division.

Figure 6A:
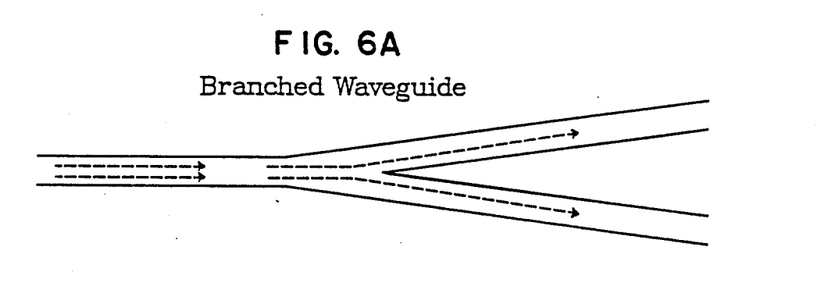
FIGS. 6A, 6B and 6C are diagrams of optical waveguide splitters which may be used in an implementation of the invention.
Figure 6B:
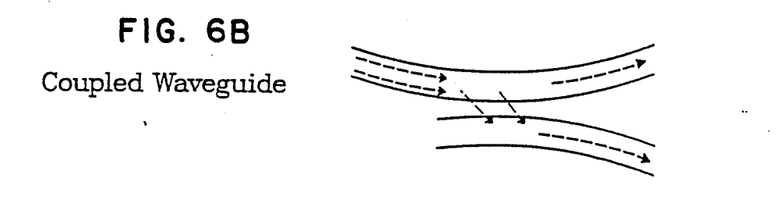
Figure 6C:
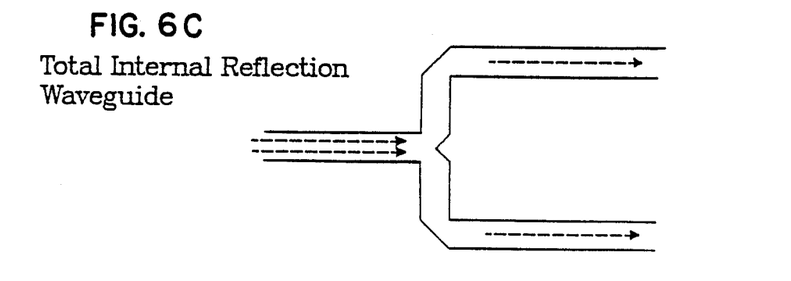

Waveguide beamsplitters can be implemented in a variety of technologies including ion exchanged glasses, polymers, and semiconductors. The waveguide splitters can be patterned into various topologies such as branching splitters, couplers, and total internal reflection devices. Examples of these are shown in FIGS. 6A, 6B and 6C, respectively. The waveguide approach offers an advantage of small size and integration with other opto-electronic components. Thus, in VLSI or WSI circuits, glass and polymeric waveguides can be formed directly on the top of the chip or wafer surface.

Figure 7:
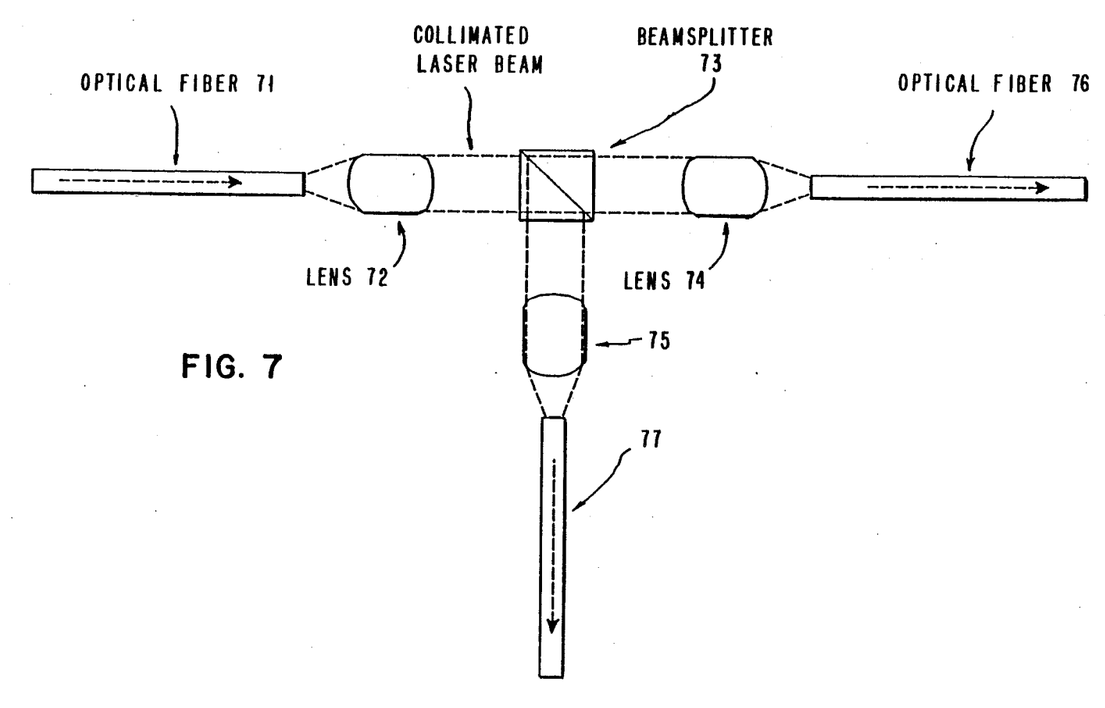
FIG. 7 illustrates a bulk optical component beamsplitter which may be used in an implementation of the invention.

Bulk optical components can be used to fashion beamsplitters from prisms, mirrors, and lenses as depicted in FIG. 7. In this example, an input optical fiber 71 is coupled to a gradient-index (GRIN) lens 72 to form a collimated beam directed to beam splitter 73. The beam splitter 73 passes a fraction of the light to a second GRIN lens 74 and deflects the remainder of the light to a third GRIN lens 75. The lens 74 couples the light to a first output optical fiber 76, while the lens 75 couples the light to a second output optical fiber 77.

Returning now to FIG. 1, each fiber has a different fixed length. Thus, light pulses have different transit times through the various fibers. The relative time delay between the optical pulses, which is the difference in transit times, is proportional to the difference in fiber length. It is convenient but not necessary that the maximum time delay be less than the period of the clock pulse train. A difference of approximately twenty centimeters in fiber length gives one nanosecond delay. Since the time delays required (less than 4ns) can be generated with short fiber lengths and the distances within the computing system are relatively short, it is convenient to use multi-mode fibers. An advantage of using multi-mode fibers is the ease of coupling to sources and detectors, due to the large numerical aperture and core size. The accuracy of the time delay between fibers is generally determined by the accuracy to which the fiber lengths are manufactured.

Figure 2:
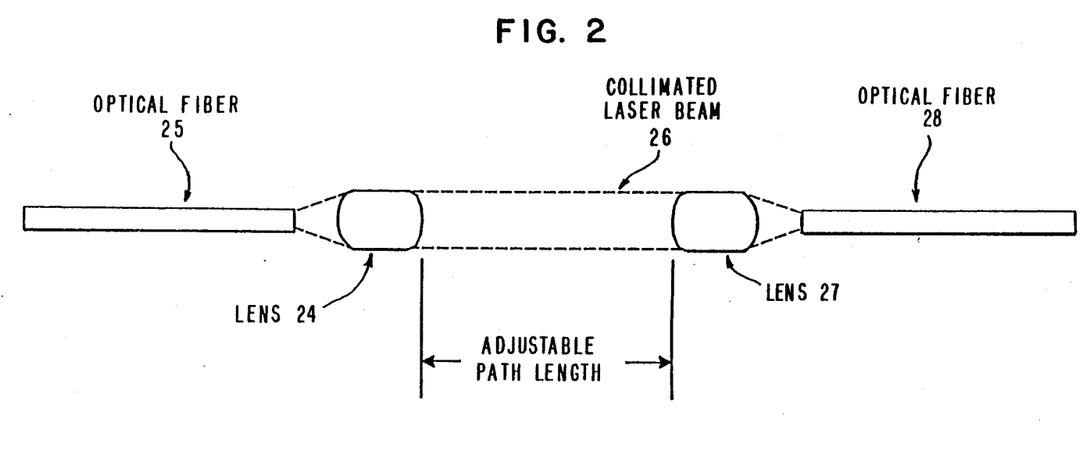
FIG. 2 illustrates an adjustable optical delay line according to the invention.

If greater temporal accuracy is required, the fiber lengths can be individually chosen for desired performance. This process can be aided by the use of optical time domain reflectometry techniques. Optionally, the fiber delays may be finely adjusted by the use of a variable optical delay line, as shown in FIG. 2. This may be implemented by mechanically adjusting a collimated light path. For example, the fiber-optic delay lines may be terminated by a GRIN lens 24, which collimates the output of the fiber 25. This collimated laser beam 26 then travels through a gas or liquid medium, then collected by another GRIN lens 27, and coupled into the output fiber 28. Varying the spacing between the GRIN lens pair 24, 27 provides fine adjustment of the time delay. If air is used as the medium, the resolution is approximately 3.3ps/mm. Adjustment of the delay mechanism would generally be an initial setup procedure, but it can be made automatic for performance tuning.

Each delayed output is then applied to a 1-by-M optical splitter/coupler 20. The fibers are then regrouped to form M bundles, each having N fibers with the individual timing signals. Each bundle is then directly coupled to the opto-electronic pulse converter (optical receiver) 14 on the computer module 22, which is a package element containing one or more computer logic chips. Thus, each bundle delivers the appropriate optical timing signals directly to the computer timing chips with minimal timing skew, due to the well-defined fiber transmission properties.

It is clear that the distribution and timing of optical signals can be achieved by using bulk optical components such as mirrors, prisms, and lenses. The use of optical fibers offers the advantages of being compact (due to higher delay per unit length than air), mechanically stable, flexible (since the path is not constrained to line-of-sight operation), and reliable while minimizing crosstalk (since the light is confined within the fiber waveguide).

Figure 3:
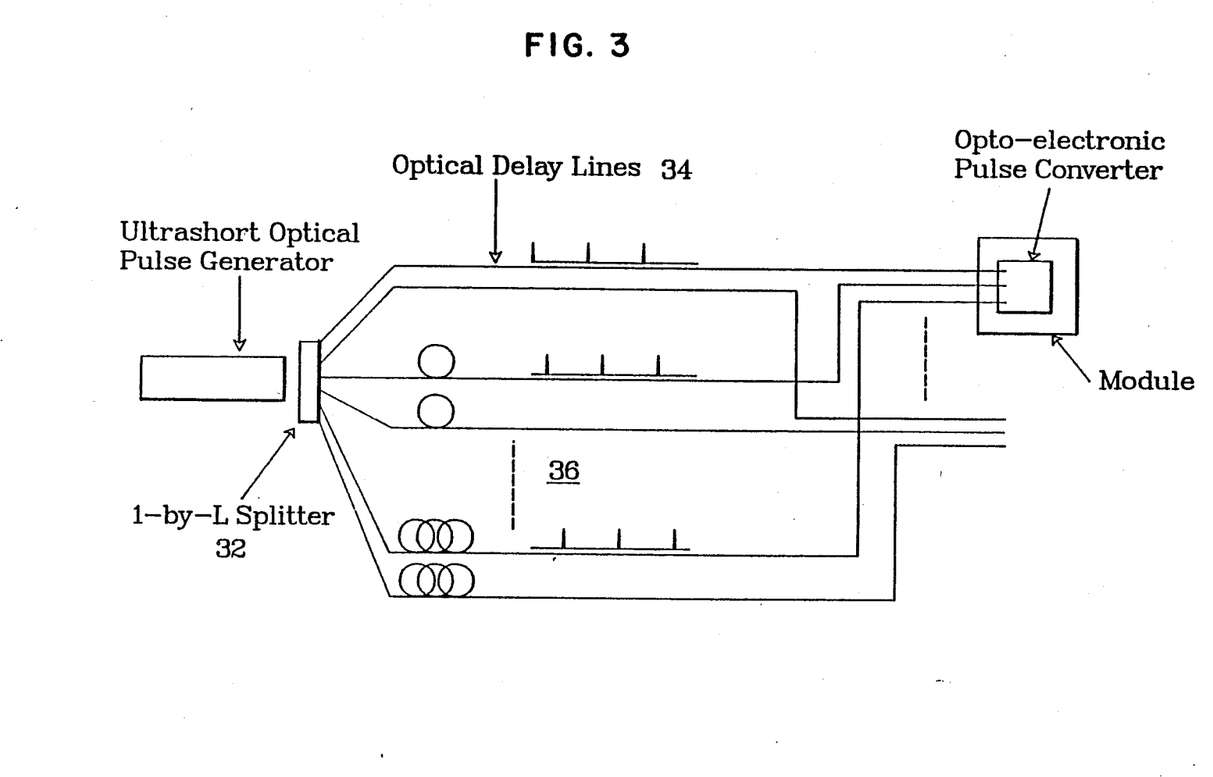
FIG. 3 is a block diagram of an optical clock distribution system showing an alternative configuration for fiber-optic delay lines placed after the splitter.

Alternatively, the system, 36, may be configured with a single 1-by-L optical splitter, 32, (where L is equal to $N \times M$) followed by individual fiber-optic delay lines, 34. In this configuration, the individual fibers, which are inherently the transmission medium, are also the delay elements. This system is functionally equivalent to the previously described configuration (which uses two sets of beamsplitters) but only requires the use of a single beamsplitter.

At the receiver, the short optical pulses are converted to electrical signals. Since the optical power is at a relatively high level, a very simple receiver with one or two gain stages, is required. With sufficient optical power, a detector alone, with no gain stages, will provide a logic level signal. Suitable detector technologies include PIN photodiodes, avalanche photodiodes, Schottky barrier detectors, and photoconductive devices.

Figure 4:
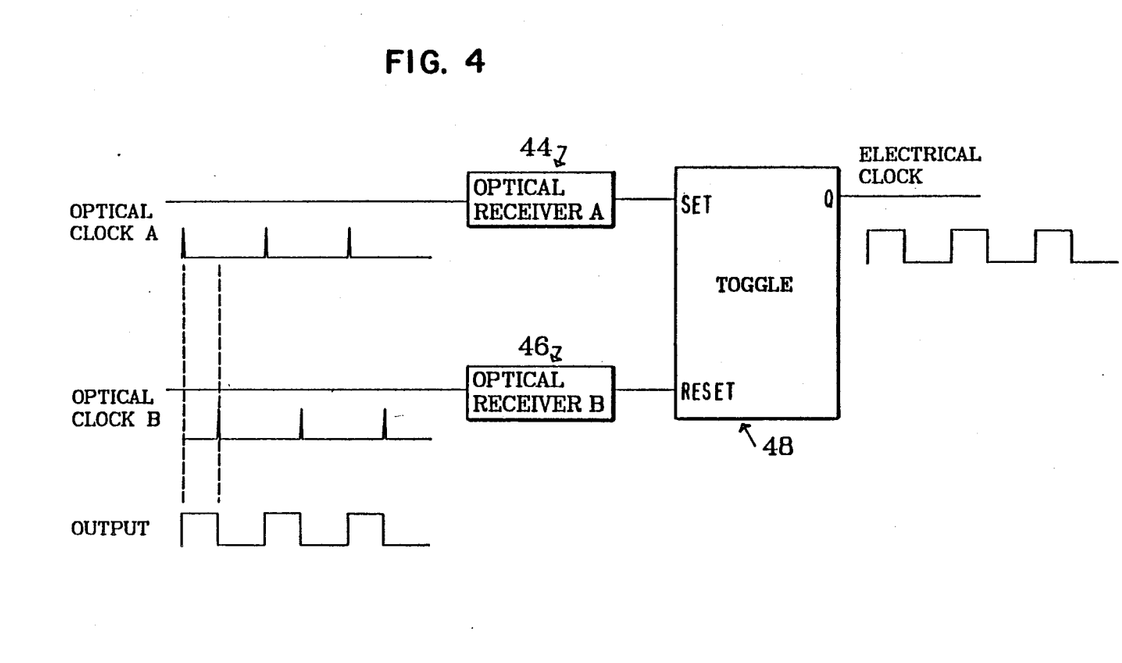
FIG. 4 is a block diagram sowing the manner in which optical clock pulses are converted to electrical clock pulses.

The various timing pulses are then applied in pairs to toggle circuits, or more accurately, set-reset bistable (flip-flop) circuits, as shown in FIG. 4. The leading edge of a light pulse arriving at optical receiver 44, denoted Receiver A, sets the bistable toggle 48, providing a logical "1" output. The leading edge of a delayed pulse arriving at optical receiver 46, denoted Receiver B, resets the toggle 48, returning the output to a logical "0" state, thus converting the fast optical trigger pulses into a train of electrical signals of the desired pulse duration, duty cycle and phase timing. This system is referred to as an opto-electronic toggle, or simply OPTOGLE. As the OPTOGLE is triggered by arrival of two ultrashort pulses, the converted electrical clock signal has leading and trailing edges of low skew. This is one of the advantages of the optical clock system of the present invention, as both edges of the clock signal are typically used in computer systems.

It is also possible to use one light pulse to generate a clock signal using on-chip pulse shaping circuitry. The advantage is that the requirement for the laser power is reduced because of smaller division instead of the $N \times M$ division of the preferred embodiment. However, the present processing technology for semiconductor integrated circuits is not tight enough to minimize skew.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An optical clock distribution system comprising:
    optical pulse timing generator means for generating optical pulses having a predetermined repetition rate and duration,
    a passive optical time delay line network composed of a plurality of optical time delay means coupled to said optical timing generator means for propagating optical pulses with different transient times, and
    a plurality of opto-electronic toggle means at different locations remote from said pulse timing generator means, each of said toggle means being coupled to a pair of optical time delay means for combining delayed optical timing signals to generate electrical clock signals with minimum skew at each of said different locations.

2. The optical clock distribution system recited in claim 1 wherein said optical pulse timing generator means produces a train of short duration optical pulses of precisely controlled period.

3. The optical clock distribution system recited in claim 2 wherein said timing generator means is a mode-locked laser.

4. The optical clock distribution system recited in claim 2 wherein the generator is a gain-switched laser.

5. The optical clock distribution system recited in claim 1 wherein said plurality of toggle means are formed in an integrated circuit and said passive optical time delay line network includes optical waveguides formed on a surface of the integrated circuit and directly coupled to said toggle means.

6. An optical clock distribution system comprising:
    an ultrashort optical timing generator,
    a 1-by-N optical splitter/coupler receiving optical pulses from said timing generator and dividing said pulses equally into N outputs,
    a plurality of N optical delay lines each having a different pulse propagation transit time delay and connected to said pulse generator via the N outputs of said 1-by-N splitter/coupler,
    N 1-by-M optical splitter/ couplers each connected to one of said N optical delay lines and dividing pulses equally into M outputs,
    $N \times M$ optical delay lines connected to the outputs of said 1-by-M splitters, and a plurality of optical receiver means at different locations remote from said optical timing generator, each of said receiver means connected to a pair of said M×N optical delay lines for converting said optical pulses to electrical clock pulses having a desired pulse duration, duty cycle and phase timing with minimum skew, each of said optical receiver means being directly connected to a module requiring clock pulses.

7. The optical clock distribution system recited in claim 6 wherein each of said optical receiver means comprises:

a first optical receiver connected to a first one of said N×M optical delay lines and generating a first electrical pulse corresponding to a first delayed optical pulse, a second optical receiver connected to a second one of said N×M optical delay lines and generating a second electrical pulse corresponding to a second delayed optical pulse, and a bistable device set by said first electrical pulse and reset by said second electrical pulse to produce an output electrical pulse having leading and trailing edges determined by said first and second electrical pulses.

8. The optical clock distribution system recited in claim 6 wherein the optical splitter/couplers are fiber splitters.

9. The optical clock distribution system recited in claim 6 wherein the optical splitter/couplers are optical waveguide splitters.

10. The optical clock distribution system recited in claim 6 wherein the optical splitter/couplers are comprised of bulk optical components.

11. The optical clock distribution system recited in claim 6 wherein said N optical delay lines include means for adjusting the transit delays of said lines over a continuous range of delays.

12. The optical clock distribution system recited in claim 11 wherein said adjusting means comprises:

a first collimating lens coupled to a first portion of a delay line, and a second collimating lens coupled to a second portion of a delay line, said first and second collimating lens having a common optical axis and adjustable along said axis to vary the distance between said first and second collimating lenses.

13. An optical clock distribution system comprising:

a ultrashort optical pulse timing generator, a 1-by-L optical splitter/coupler receiving optical pulses from said timing generator and dividing said pulses equally into L outputs, a plurality of L optical delay lines each having a different pulse propagation transit time delay and connected to said pulse generator via the L outputs of said 1-by-L splitter/coupler, and a plurality of optical receiver means at different locations remote from said optical pulse timing generator, each of said receiver means connected to a pair of said L optical delay lines for converting said optical pulses to electrical clock pulses having a desired pulse duration, duty cycle and phase timing with minimum skew, each of said optical receiver means being directly connected to a module requiring clock pulses.

14. The optical clock distribution system recited in claim 13 wherein said optical receiver means comprises:

a first optical receiver connected to a first one of said L optical delay lines and generating a first electrical pulse corresponding to a first delayed optical pulse, a second optical receiver connected to a second one of said L optical delay lines and generating a second electrical pulse corresponding to a second delayed optical pulse, and a bistable device set by said first electrical pulse and reset by said second electrical pulse to produce an output electrical pulse having leading and trailing edges determined by said first and second electrical pulses.

15. The optical clock distribution system recited in claim 13 wherein the optical splitter/couplers are fiber splitters.

16. The optical clock distribution system recited in claim 13 wherein the optical splitter/couplers are optical waveguide splitters.

17. The optical clock distribution system recited in claim 13 wherein the optical splitter/couplers are comprised of bulk optical components.

18. The optical clock distribution system recited in claim 13 wherein said L optical delay lines include means for adjusting the transit delays of said lines over a continuous range of delays.

19. The optical clock distribution system recited in claim 18 wherein said adjusting means comprises:

a first collimating lens coupled to a first portion of a delay line, and a second collimating lens coupled to a second portion of a delay line, said first and second collimating lens having a common optical axis and adjustable along said axis to vary the distance between said first and second collimating lenses.

* * * * *